(12) United States Patent
Lee et al.

(10) Patent No.: US 12,231,493 B2
(45) Date of Patent: Feb. 18, 2025

(54) METHOD AND DEVICE FOR SYNCHRONIZING DEVICE SETTINGS

(71) Applicant: Samsung Electronics Co., Ltd., Gyeonggi-do (KR)

(72) Inventors: Sijun Lee, Gyeonggi-do (KR); Hoseon Shin, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/114,324

(22) Filed: Feb. 27, 2023

(65) Prior Publication Data

US 2023/0254367 A1 Aug. 10, 2023

Related U.S. Application Data

(63) Continuation of application No. PCT/KR2022/020671, filed on Dec. 19, 2022.

(30) Foreign Application Priority Data

Feb. 9, 2022 (KR) .................. 10-2022-0016884

(51) Int. Cl.
*H04L 67/1095* (2022.01)
*H04L 67/131* (2022.01)

(52) U.S. Cl.
CPC ........ *H04L 67/1095* (2013.01); *H04L 67/131* (2022.05)

(58) Field of Classification Search
None
See application file for complete search history.

(56) References Cited

U.S. PATENT DOCUMENTS

| | | | | |
|---|---|---|---|---|
| 9,338,200 | B2* | 5/2016 | Park | A63F 13/79 |
| 11,095,727 | B2* | 8/2021 | Oh | G06F 3/0488 |
| 11,195,020 | B1* | 12/2021 | Yan | G06T 15/205 |

(Continued)

FOREIGN PATENT DOCUMENTS

| | | |
|---|---|---|
| KR | 10-2006-0133079 A | 12/2006 |
| KR | 10-2010-0080862 A | 7/2010 |

(Continued)

OTHER PUBLICATIONS

Wikipedia Metaverse https://ko.wikipedia.org/wiki/%EB%A9%94%ED%83%80%EB%B2%84%EC%8A%A4.

(Continued)

*Primary Examiner* — Lashonda Jacobs-Burton
(74) *Attorney, Agent, or Firm* — Cha & Reiter, LLC

(57) ABSTRACT

Provided is a method of synchronizing device information between a terminal of a virtual environment (e.g., a metaverse environment) and a terminal of a real space. The operating method of a server includes receiving, from a first terminal, a request to register device information, obtaining device information of a second terminal, in the metaverse, corresponding to the first terminal, based on device matching information, and determining device information of the first terminal, based on the device information of the second terminal, in which the device matching information is determined based on innate attributes of the first terminal and the second terminal.

20 Claims, 11 Drawing Sheets

(56) References Cited

U.S. PATENT DOCUMENTS

| | | | |
|---|---|---|---|
| 11,429,338 B2* | 8/2022 | Allen | G06F 3/011 |
| 11,729,015 B2* | 8/2023 | Wann | G06Q 10/087 |
| | | | 370/254 |
| 2010/0228633 A1 | 9/2010 | Guimaraes et al. | |
| 2012/0266256 A1 | 10/2012 | Kawachiya et al. | |
| 2016/0366708 A1* | 12/2016 | Yeom | H04W 4/80 |
| 2018/0322563 A1* | 11/2018 | Wan | G06Q 30/0633 |
| 2019/0246440 A1* | 8/2019 | Bae | H04W 8/005 |
| 2020/0045546 A1* | 2/2020 | Zhou | H04L 61/2514 |
| 2020/0267045 A1* | 8/2020 | Defiebre | G06F 9/5077 |
| 2021/0297978 A1* | 9/2021 | Lee | H04W 60/00 |
| 2022/0108536 A1* | 4/2022 | Jung | G06T 19/00 |
| 2022/0239648 A1* | 7/2022 | Ramachandran | H04L 63/0876 |
| 2022/0248483 A1* | 8/2022 | Cheong | H04L 67/55 |
| 2022/0335440 A1* | 10/2022 | Brazao | G06F 16/9038 |
| 2022/0337611 A1* | 10/2022 | Brazao | G16Y 20/20 |
| 2023/0131432 A1* | 4/2023 | Brazao | H04L 9/3263 |
| 2024/0020354 A1* | 1/2024 | Benedetto | G06Q 30/06 |

FOREIGN PATENT DOCUMENTS

| | | |
|---|---|---|
| KR | 10-2012-0019007 A | 3/2012 |
| KR | 10-2012-0106367 A | 9/2012 |
| KR | 10-2014-0103468 A | 8/2014 |
| KR | 10-2016-0124087 A | 10/2016 |
| KR | 10-2019-0093764 | 8/2019 |
| KR | 10-2020-0000803 | 1/2020 |
| KR | 10-2020-0011443 A | 2/2020 |
| KR | 10-2020-0013232 | 2/2020 |

OTHER PUBLICATIONS

Selection of Main Type of Meta-Biz as Next-Generation U-Biz using FDM.

International Search Report dated Mar. 21, 2023.

* cited by examiner

Location information table (217-1)

| User ID | Location name | Room name | Is virtual |
|---|---|---|---|
| ux3shrdw | My home | Main room | true |
| ux3shrdw | My home | Living room | true |

Device matching information table (217-3)

| User ID | Real device ID | Virtual device ID |
|---|---|---|
| ux3shrdw | asdf-1234 | Virtual-1047 |
| ux3shrdw | | Virtual-1024 |

Device information (217-5)

| User ID | ux3shrdw |
|---|---|
| Device ID | asdf-1234 |
| Device name | |
| Device type | Speaker |
| Device model | SM-V310 |
| Location name | |
| Room name | |
| Capability | {Bixby, volume,...} |
| Is virtual | false |

FIG. 2B

METHOD AND DEVICE FOR SYNCHRONIZING DEVICE SETTINGS

CROSS-REFERENCE TO RELATED APPLICATIONS

This application is a continuation application of International Application No. PCT/KR2022/020671 designating the U.S., filed on Dec. 19, 2022, in the Korean Intellectual Property Receiving Office and claiming priority to Korean Patent Application No. 10-2022-0016884, filed on Feb. 9, 2022, in the Korean Intellectual Property Office, the disclosures of which are incorporated by reference herein in their entireties.

BACKGROUND

1. Field

The disclosure relates to a method and device for synchronizing device settings, and more particularly, to a method of synchronizing device information between a terminal of a virtual environment (e.g., a metaverse environment) and a terminal of a real space.

2. Description of Related Art

Virtual-reality technology refers to establishing a virtual space which does not exist in the real world. The virtual space is established by using a computer. Augmented-reality or mixed-reality technology refers adding information generated by a computer to the real world. That is, combining a virtual world with the real world and enabling a real-time interaction with a user.

Representative examples of integrating and using the augmented-reality technology in a broadcast can include smoothly changing a weather map in front of a television (TV) meteorologist. Another example can be an image or graphic, which does not actually exist in a stadium, but is inserted in a video broadcast to appear as if the advertisement image actually existed in the stadium. For example, many broadcasts of American football insert a yellow line that indicates how far a team must proceed before achieving a "first down." The yellow line appears in the broadcast, but does not actually appear in the field in the stadium.

A representative service for providing a user with augmented reality or mixed reality is the 'metaverse'. The metaverse is a compound word of 'meta' meaning virtual or abstract and 'universe' meaning a world, which refers to three-dimensional virtual reality. The metaverse is a more advanced concept than a typical virtual reality environment and provides an augmented-reality environment which absorbs virtual reality, such as a web and the Internet, in the real world.

SUMMARY

There may generally be multiple Internet of Things (IoT) devices in one house. To distinguish one from another, a location or a room name may be used to identify the IoT devices. A user may need to designate or input a location or a room name to a setting app.

A product, a device, or the like that exists in the real world may be provided to the user in a metaverse area. However, device settings may need to be inputted again, by connecting the devices, in a real space with a user's account or by exchanging information with the devices.

Embodiments to be provided hereinafter that may synchronize device information between a terminal in a virtual environment (e.g., a metaverse environment) and a terminal in the real space. Synchronizing device information alleviates the need to directly input device information.

According to certain embodiments, an operating method of a server comprises: receiving, from a first terminal, a request to register device information; obtaining device information of a second terminal, in a metaverse, based on device matching information stored at the server that for the first terminal; and determining device information of the first terminal, based on the device information of the second terminal, wherein the device matching information comprises innate attributes of the first terminal and the second terminal.

According to certain embodiments, an operating method of a server comprises: obtaining device information of a first terminal; determining device information of a second terminal based on the device information of the first terminal, in a metaverse; and providing an interface for guiding whether to add the second terminal to the metaverse, wherein providing the interface comprises providing an interface for providing the device information of the second terminal.

According to an embodiments, an Internet of Things (IoT) terminal comprises: a memory storing at least one instruction; and at least one processor configured to execute the at least one instruction, wherein execution of the at least one instruction by the at least one processor causes the at least one processor to perform a plurality of operations, the plurality of operations comprising: transmitting, to a server, a request to register device information of the IoT terminal, and based on the device information, received from the server, of the IoT terminal, providing a device registration interface.

Embodiments to be provided hereinafter may exclude the need for a user to directly input device information by synchronizing device information between a terminal in a virtual environment (e.g., a metaverse environment) and a terminal in the real space.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 2B is a diagram illustrating tables stored in a device information database, according to one embodiment;

DETAILED DESCRIPTION

Figure 1:
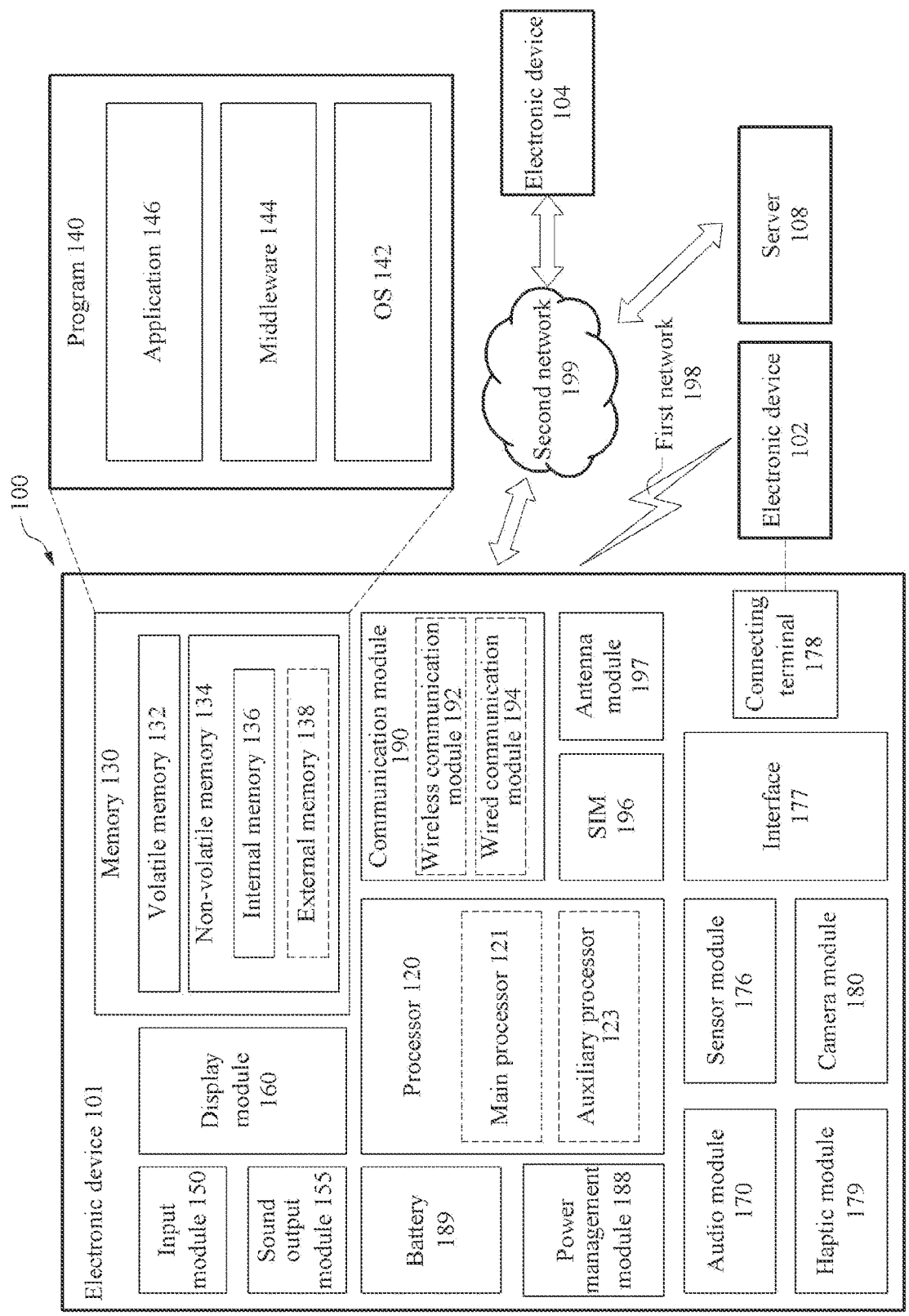
FIG. 1 is a block diagram illustrating an electronic device in a network environment, according to one embodiment.

Hereinafter, embodiments will be described in detail with reference to the accompanying drawings. When describing the embodiments with reference to the accompanying drawings, like reference numerals refer to like elements and a repeated description related thereto will be omitted. FIG. 1 describes an electronic device 101, where certain embodiments of this disclosure may be practiced.

Electronic Device

FIG. 1 is a block diagram illustrating an electronic device 101 in a network environment 100, according to one embodiment.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The term "processor" shall be understood to refer to both the singular and plural context in this document.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146. The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal and vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199).

According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101.

According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 can have certain settings. The settings can include modes of operation, such as power modes, brightness of the display, default volume of the speakers, network defaults, modes for providing different alerts and notifications, to name a few examples. The electronic device 101 can have a counterpart device in a metaverse. Certain embodiments, of the present disclosure may provide a way for the settings of the electronic device 101 and the counterpart device in the metaverse to be synchronized.

Figure 2A:
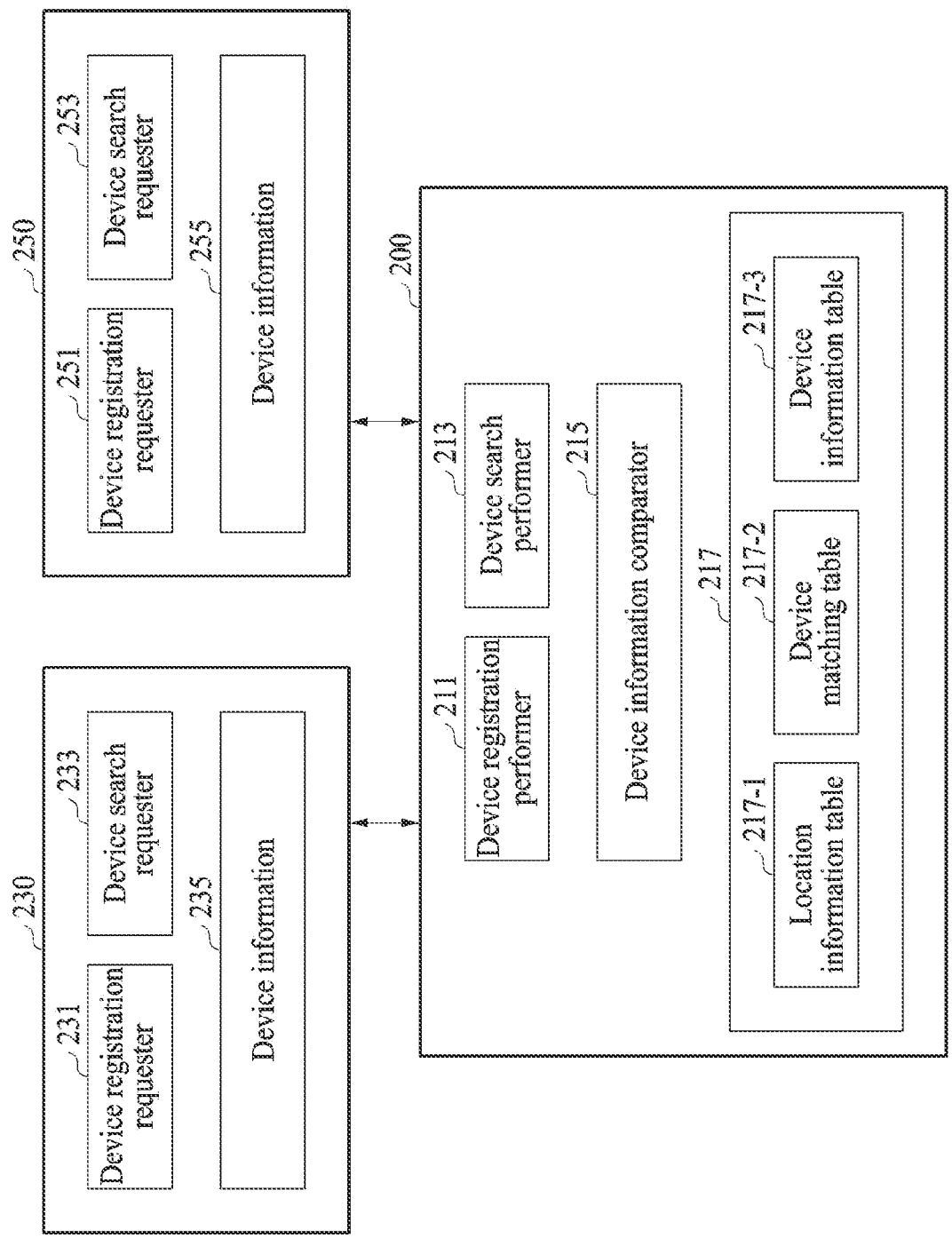
FIG. 2A is a diagram illustrating a device setting synchronization system according to one embodiment.

FIG. 2A is a diagram illustrating a device setting synchronization system according to one embodiment.

Referring to FIG. 2A, the device setting synchronization system may include a server 200, a first terminal 230, and a second terminal 250 as agents. The first terminal 230 may comprise the electronic device 101 in real space, while the second terminal 250 may be a counterpart to the first terminal 230 in the virtual space. The server 210 includes a device information database 217. When the first terminal 230 (in the real world) registers with the server 210, the server 210 obtains device information of the second terminal 250 (in the metaverse). The server 210 determines the second terminal based on device matching information stored in the device information database 217. From the second terminal's device information, the server 210 determines the first terminal's device information.

The server 210 may perform and provide device setting synchronization between the first terminal 230 that is in a real space and the second terminal 250 that is in a virtual space (e.g., a metaverse space). The server 200 may be referred to as an IoT device information management server.

The first terminal 230 is a terminal that is in the real space, for example, an IoT device. Alternatively, the first terminal 230 may be a device that may use a voice assistant or that may control an IoT device. Hereinafter, the first terminal 230 may be construed synonymously as an IoT apparatus, an IoT device, an IoT terminal, a real terminal, and a user terminal. The real space may be construed synonymously as a real environment, a real world, a real-world space, an actual environment, and an actual world.

The second terminal 250 may be a virtual device that is for a metaverse environment and may provide an interface that is for the metaverse environment, not in an embedded form in an actual device. The second terminal 250 may provide the same functions, in the metaverse, as the first terminal 230 in the real space, may provide some of the functions according to the constraints of the metaverse environment, or may receive a virtual result in the form of a server application programming interface (API). Hereinafter, the metaverse environment may be construed synonymously as a metaverse space, a metaverse world, a virtual environment, and a virtual world.

Registering a device may need to be performed prior to controlling the first terminal 230 (e.g., the IoT device). A device name for a user to identify the first terminal 230, a location name and a room name to efficiently control the first terminal 230 when there are multiple devices, and the like may be input to the server when registering the first terminal 230.

According to the device setting synchronization system, by using device information of the second terminal 250, the user may avoid inputting device information of the first terminal 230.

For example, when the user installs the first terminal 230 for the first time, the server 210 may check for second terminal 250 corresponding to the first terminal 230 in the metaverse. When there is a second terminal 250 corresponding to the first terminal 230 in the metaverse, the server 210 may obtain the device information of the second terminal 250 and transmit the same to the first terminal 230. The user of the first terminal 230 may register the first terminal 230, based on the received device information of the second terminal 250.

Likewise, when the user purchases the first terminal 230 in the real world and performs registration of the second terminal 250, in the metaverse, the user may register the second terminal 250 in the metaverse by using the device information of the first terminal 230.

More specifically, the first terminal 230 may include a device registration requester 231, a device search requester 233, and device information 235. The second terminal 250 may include a device registration requester 251, a device search requester 253, and device information 255. The server 210 may include a device registration performer 211, a device search performer 213, a device information comparator 215, and a device information database 217. The device registration requester 231, device search requester 233 in the first terminal 230, the device registration requester 251, device search requester 253 in the second terminal 250, and the device registration performer 211, device search performer 213, and device information comparator 215 on the server 210 may comprise a plurality of executable instructions stored in a memory that may form a program or a function of a program. The device information 235, device information 255, and device information database 217 may comprise information stored in a memory.

When receiving a request to register device information from the user, the device registration requester 233 of the first terminal 230 may transmit, to the server 210, the request to register device information. The request to register device information may include essential information of the first terminal 230. The first terminal may receive, from the server 210, the device information of the first terminal 230. Although described in detail below, the essential information may include at least one of user identification information (e.g., a user account identification (ID)), device identification information (e.g., a device ID), a device type, a device model name, and whether the device is a virtual device.

Likewise, when receiving a request to register device information from the user, the device registration requester 253 of the second terminal 250 may transmit, to the server 210, the request to register device information including essential information of the second terminal 250 and may receive, from the server 210, the device information of the second terminal 250.

The device registration performer 211 of the server 210 that receives the request to register device information from the first terminal 230 may transmit, to the device information comparator 215, the essential information of the first terminal 230. The device information comparator 215 which receives the essential information of the first terminal 230 may obtain the device information of the second terminal 250, and based on the device information, may determine the device information of the first terminal 230. Accordingly, the server 210 may transmit, to the first terminal 230, the determined device information of the first terminal 230.

Likewise, the device registration performer 211 that receives the request to register device information from the second terminal 250 may transmit, to the device information comparator 215, the essential information of the second terminal 250. The device information comparator 215 which receives the essential information of the second terminal 250 may obtain the device information of the first terminal 230, wherein the first terminal 230 corresponding to the second terminal 250. Based on the device information of the first terminal 230, may determine the device information of the second terminal 250 and transmit, to the second terminal 250, the determined device information of the second terminal 250.

Upon the request of the device registration performer 211 or the device search performer 213, the device information comparator 215 may search for a terminal being only in a certain environment (e.g., the real-world environment or the metaverse environment) and perform device information matching with a requested device.

More specifically, when the device registration performer 211 receives, from the first terminal 230, a request to register device information, the device information comparator 215 may inquire for device identification information being only in the virtual environment. Based on a device matching information table 217-2 in the device information database 217, the device registration performer 211 may specify the second terminal 250 (e.g., a terminal that is the same as the first terminal 230 or that has a similarity greater than or equal to a predetermined similarity to the first terminal 230) corresponding to the first terminal 230, and may determine location information (e.g., a location name or a room name), a device name, and the like of the first terminal 230 using the device information of the second terminal 250.

In certain embodiments, the device matching information may comprise a plurality of records, each identifying terminals in the real world with corresponding terminals in the metaverse, and vice versa. Accordingly, the server 210 can look up the first terminal or the second terminal, as the case may be, and determine the identity of the second terminal or first terminal that corresponds.

A detailed method of determining the device information of the first terminal 230, based on the device information of the second terminal 250, is described below with reference to FIGS. 3 to 5C.

Likewise, when registering the first terminal 230 in the metaverse environment, the device information comparator 215 may inquire for device identification information being only in the real-world environment, based on the device matching information table 217-2, may specify the first terminal 230 (e.g., a terminal that is the same as the second terminal 250 or that has a similarity greater than or equal to a predetermined similarity to the second terminal 250) corresponding to the second terminal 250, and may determine location information (e.g., a location name or a room name), a device name, and the like of the second terminal 250 by using the device information of the first terminal 230. A detailed method of determining the device information of the second terminal 250, based on the device information of the first terminal 230, is described below with reference to FIGS. 6 to 8.

When receiving, from the user, an instruction for controlling the first terminal 230, the device search requester 233 of the first terminal 230 may transmit, to the server 210, information (e.g., a request for searching for the first terminal 230) for performing the instruction by using device information (e.g., a device name or a device type) uttered by the user. The device search requester 233 may transmit, to the server 210, information, together, whether a target of the instruction is a device in the real space or a device in the metaverse environment.

For example, the user may give the instruction (e.g., "Volume up the 'sweet' speaker!) for controlling the first terminal 230 by using a voice assistant and the device search requester 233 may receive the instruction and transmit, to the server 210, information for performing the instruction.

Likewise, when receiving, from the user, an instruction for controlling the second terminal 250, the device search requester 253 of the second terminal 250 may transmit, to the server 210, information (e.g., a request for searching for the second terminal 250) for performing the instruction by using device information (e.g., a device name or a device type) uttered by the user. The device search requester 253 may transmit, to the server 210, information, together, whether a target of the instruction is a device in the real space or a device in the metaverse environment.

The device search performer 213 of the server 210 may perform device search, based on the information received from the device search requester 233 or 253. The device search performer 213, by using the information, may search for a device suitable for the user's request through the device information comparator 215.

The device information database 217 may refer to a database for managing device information owned by the user and may include a location information table 217-1 for managing location information owned by the user, the device matching information table 217-2 for matching a virtual device with an actual device corresponding to the virtual device, and a device information table 217-3 for managing a device.

After completing device information matching of the first terminal 230 with the second terminal 250, the server 210 may perform and provide operation synchronization between the first terminal 230 and the second terminal 250.

More specifically, the server 210 may detect an operation of the first terminal 230 that is in the real space, for example, receiving, from the first terminal 230, an instruction (e.g., "Volume up the 'sweet' speaker!) for controlling the first terminal 230 or receiving an operation signal of the first terminal 230 when the first terminal 230 operates by itself, of the first terminal 230 that is in the real space and may transmit, to the second terminal 250 that is in the metaverse, a control signal for performing an operation corresponding to the operation of the first terminal 230.

For example, when the temperature of an air conditioner in the real space is adjusted to 18 degrees Celsius, such a setting is applied to the metaverse, an air conditioner in the metaverse may operate in the setting of 18 degrees Celsius, and a result of the operation may be applied to the metaverse. The server 210 may detect that the temperature of the air conditioner in the real space is adjusted to 18 degrees Celsius and may transmit a control signal such that the air conditioner in the metaverse is set to 18 degrees Celsius.

Likewise, the server 210 may detect that an operation of the second terminal 250 in the metaverse and may transmit, to the second terminal 230 in the real space, a control signal for performing an operation corresponding to the operation of the second terminal 250.

For example, when setting a certain IoT scene in the metaverse (for example, when setting a "movie mode", living room lights may be dimmed, a TV and a soundbar may enter Netflix, and curtains may be closed), a real device operation that matches the certain IoT scene may be generated such that an IoT scene corresponding to the certain IoT scene may be applied to devices in the real space, and the user may operate the IoT scene for the devices in the real space through a voice command, such as "movie mode", or a terminal input. The server 210 may detect an operation of an IoT scene in the metaverse and transmit a control signal for operating the IoT scene in the real space.

FIG. 2B is a diagram illustrating tables stored in a device information database, according to one embodiment.

Referring to FIG. 2B, the device information database 217 may include a location information table 217-1, a device matching information table 217-2, and a device information table 217-3.

The location information table 217-1 may include at least one of a location name (e.g., my home), a room name (e.g., a main room), and environment information (is virtual) (e.g., when the location is a location in the metaverse, a 'true' value and when the location is a location in the real space, a 'false' value) of a location, corresponding to a user ID (e.g., ux3shrdw).

The device matching information table 217-2 may include a device ID (e.g., qwer-0078) of the first terminal 230, corresponding to the user ID (e.g., ux3shrdw), and a device ID (e.g., virtual-1047) of the second terminal 250 that corresponds to the first terminal 230.

The device information table 217-3 may include essential information and input information. The essential information may be information originally stored in a device without the user's input and may include at least one of the user ID (e.g., ux3shrdw), a real device ID (e.g., asdf-1234), a device type (e.g., a speaker), a device model name (e.g., SM-V310), a device function (e.g., Bixby or volume), and whether the device is a virtual device (e.g., when the device is a terminal in the metaverse, a 'true' value and when the device is a terminal in the real space, a 'false' value). Hereinafter, the essential information may be referred to as an innate attribute.

The input information may refer to information that is needed to be input for registering a terminal and may include at least one of location information and device name information (e.g., a sweet speaker). The location information may include at least one of a location name (e.g., my home) and a room name (e.g., a main room).

Figure 3:
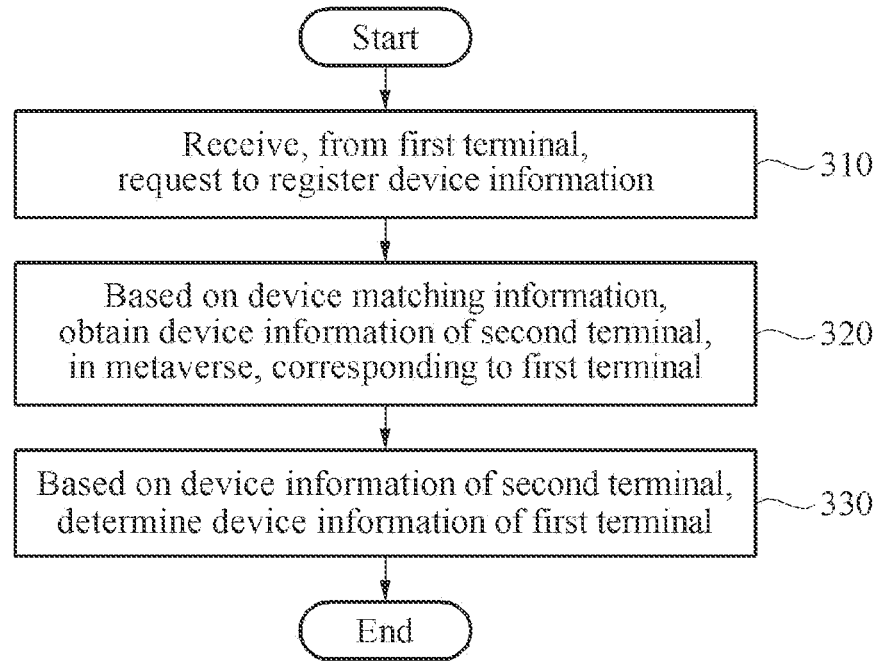
FIG. 3 is a flowchart illustrating a method of determining device information of a first terminal, based on device information of a second terminal, according to one embodiment.

FIG. 3 is a flowchart illustrating a method of determining device information of a first terminal, based on device information of a second terminal, according to one embodiment.

Operations 310, 320, and 330 of FIG. 3 may be performed by the server 210 described above with reference to FIGS. 2A and 2B, and the descriptions provided with reference to FIGS. 1, 2A, and 2B may also apply to the description of FIG. 3. Although operations of FIG. 3 may be performed in the illustrated order and manner therein, the order of some of the operations may change or some of the operations may be omitted, without departing from the spirit and scope of the illustrated embodiment. The operations illustrated in FIG. 3 may be performed in parallel or simultaneously.

Moreover, the operations described in FIG. 3 can be performed by a processor connected to a memory storing a plurality of instructions, wherein execution of the instructions causes the processor to perform the operations.

When a user installs a device in the real space for the first time, a device setting synchronization system may search for a device, in the metaverse, wherein the device in the metaverse corresponds to the device in the real space. The device in the metaverse corresponds to the device in the real space based on information of the device in the metaverse. When the device corresponding to the device in the real space is in the metaverse, the server 210 may set the device in the real space.

More specifically, in operation 310, the server 210 may receive, from the first terminal 230, a request to register device information. The first terminal 230 may transmit, to the server 210, the request to register device information. The device information may include essential information (e.g., a user account ID, a device ID, a device type, a device model name, and whether the first terminal 230 is a virtual device) of the first terminal 230.

In operation 320, the server 210, based on device matching information, may determine the identity of a second terminal and obtain device information of the second terminal 250, in the metaverse, the second terminal 250 corresponding to the first terminal 230. The server 210, based on the device matching information table 217-2, may search for the second terminal 250, in the metaverse, corresponding to the first terminal 230, and based on the device information table 217-3, may obtain the device information of the second terminal 250. In this case, the obtained device information of the second terminal 250 may include location information (e.g., a location name and a room name) and device name information.

In operation 330, the server 210, based on the device information of the second terminal 250, may determine device information of the first terminal 230. For example, the server 210 may determine the location name, room name, and device name of the second terminal 250 to be a location name, room name, and device name of the first terminal 230 as they are.

Alternatively, the server 210, based on the device matching information, may determine the device information of the first terminal 230. For example, when the location name (e.g., a house) and room name (e.g., a large room) of the second terminal 250 respectively match the location name (e.g., my home) and room name (e.g., a main room) of the first terminal 230, based on this information, the server 210 may determine the location name (e.g., my home) and room name (e.g., the main room) of the first terminal 230.

The server 210 may transmit, to the first terminal 230, the device information of the first terminal 230. The device information received by the first terminal 230 may include the location name, room name, and device name of the first terminal 230, and based on the device information, the first terminal 230 may provide an interface for providing the device information. An example of the interface for providing the device information by the first terminal 230 is illustrated in FIGS. 5B and 5C.

Figure 4:
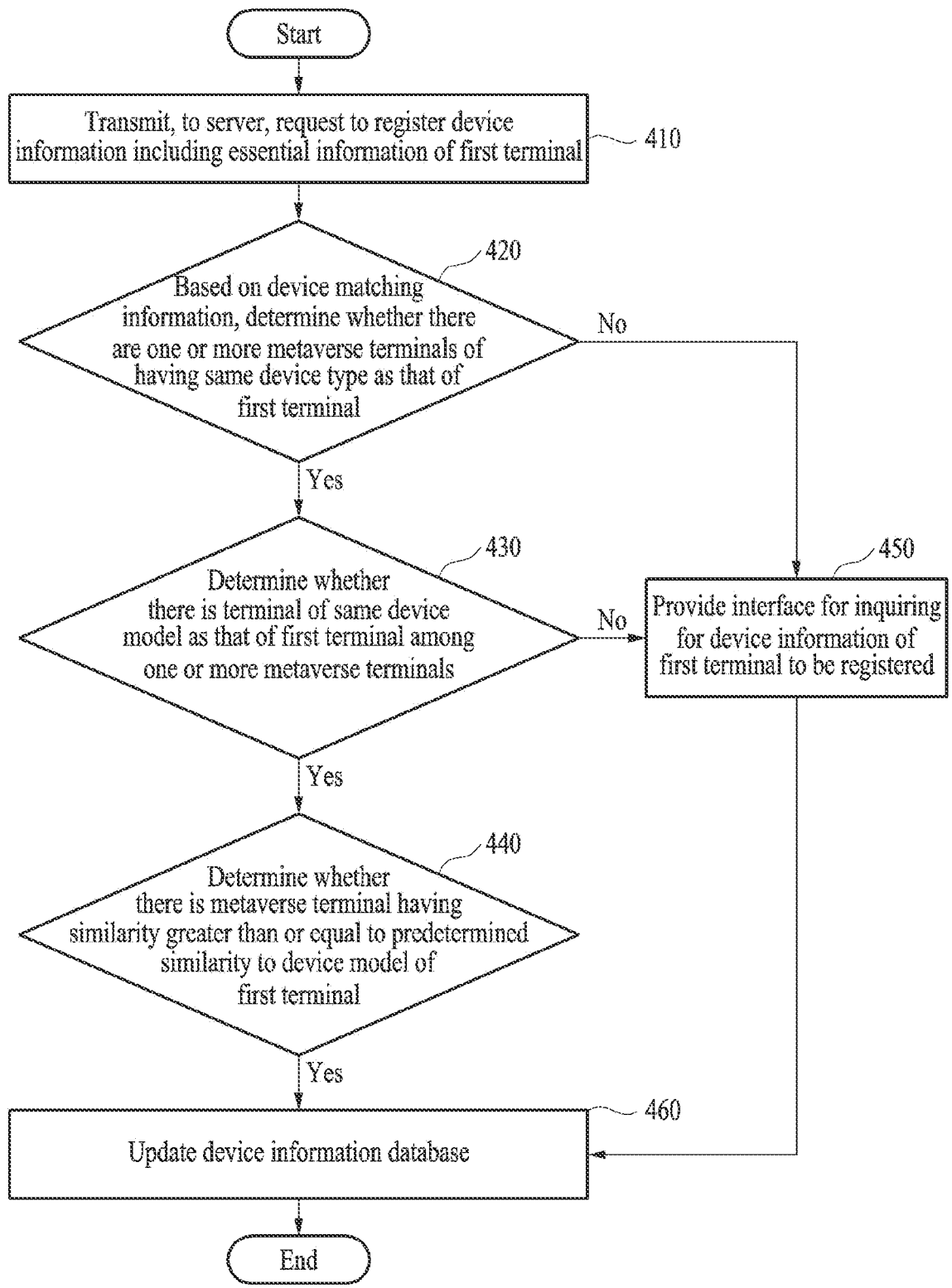
FIG. 4 is a flowchart illustrating an example of a method of determining device information of a first terminal, based on device information of a second terminal, according to one embodiment.

FIG. 4 is a flowchart illustrating an example of a method of determining device information of a first terminal, based on device information of a second terminal, according to one embodiment.

The descriptions provided with reference to FIGS. 1 to 3 may also apply to the description of FIG. 4. Although operations of FIG. 4 may be performed in the illustrated order and manner therein, the order of some of the operations may change or some of the operations may be omitted, without departing from the spirit and scope of the illustrated embodiment. The operations illustrated in FIG. 4 may be performed in parallel or simultaneously.

In operation 410, the power of the first terminal 230 that is yet to be registered and is in the real space is powered on, the first terminal 230 may transmit, to the server 210, a request to register device information including essential information of the first terminal 230.

In operation 420, the server 210, based on device matching information, may determine whether there are one or more metaverse terminals of the same device type as that of the first terminal 230.

In operation 430, the server 210, based on the determination that there are one or more metaverse terminals of the same device type as that of the first terminal 230, may determine whether there is a terminal of the same device model as that of the first terminal 230 among the one or more metaverse terminals.

In operation 440, the server 210, based on the determination that there is no metaverse terminal of the same device model as that of the first terminal 230, may determine whether there is a metaverse terminal having a similarity greater than or equal to a predetermined similarity to the device model of the first terminal 230. For example, when there is a metaverse terminal of the same device type and a model name that has similarity that is greater than or equal to the predetermined similarity although the device model is not the same, based on the device information of the metaverse terminal, the server 210 may determine the device information of the first terminal 230. In certain embodiments, similarity can be measured by a weighting a plurality of attributes, and determining a score based on the number of attributes that match.

When there is no metaverse terminal of the same device type as that of the first terminal 230, or when there is no metaverse terminal having a similarity greater than or equal to the predetermined similarity to the device model of the first terminal 230 even when there is a metaverse terminal of the same device type as that of the first terminal 230, in operation 450, the server 210 may provide an interface for inquiring for the device information (e.g., location information and device name information) of the first terminal 230 to be registered. The user may directly input the device information of the first terminal 230 and perform registration of the first terminal 230.

When the second terminal 250 corresponding to the first terminal 230 is determined, the server 210, based on device information of the second terminal 250, may determine the device information of the first terminal 230, and transmit, to the first terminal 230, the device information of the first terminal 230.

In operation 460, the server 210 may update the device information database 217.

Figure 5A:
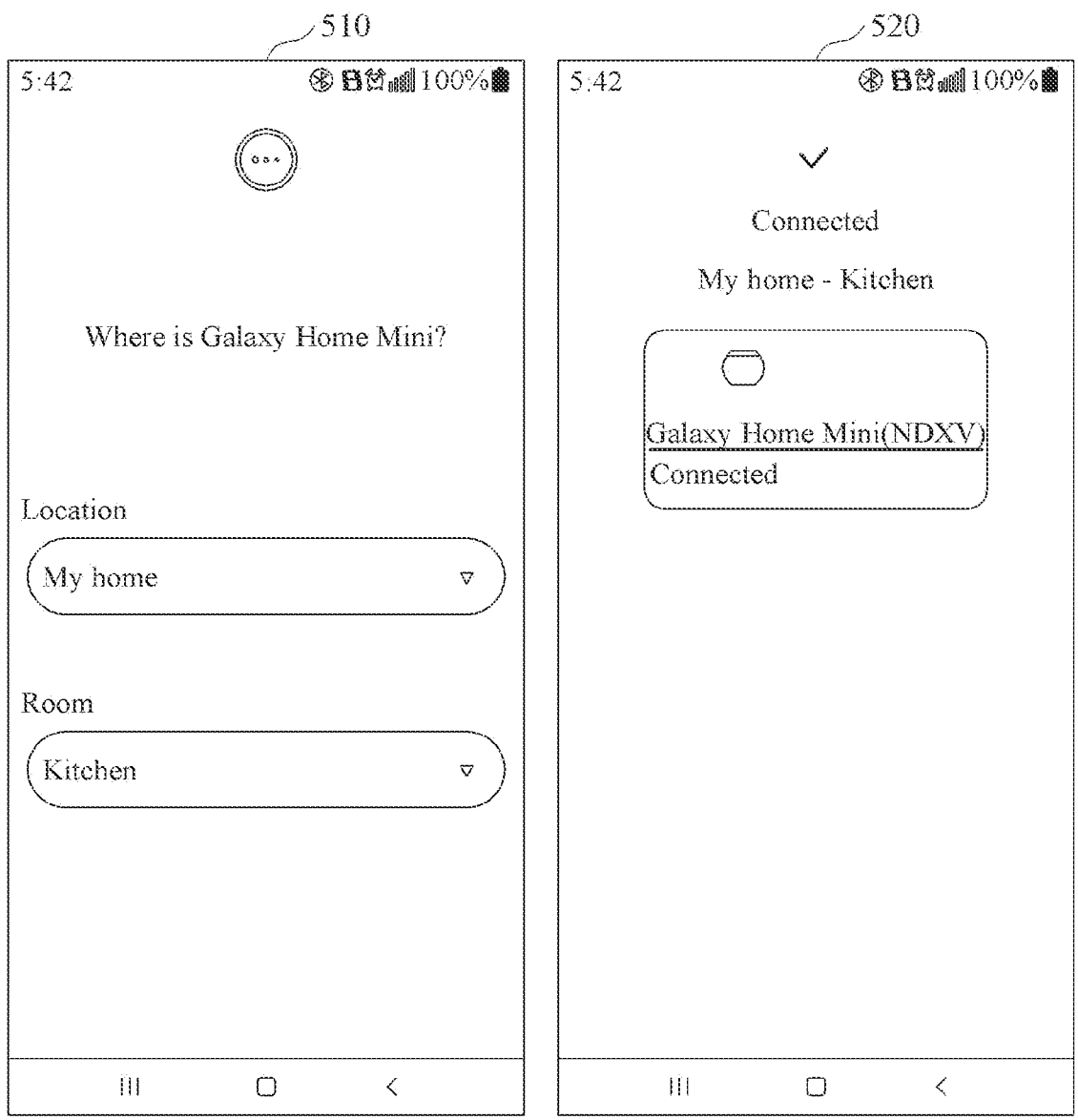
FIG. 5A is a diagram illustrating an example of an interface for receiving device information directly from a user, according to one embodiment.
Figure 5B:
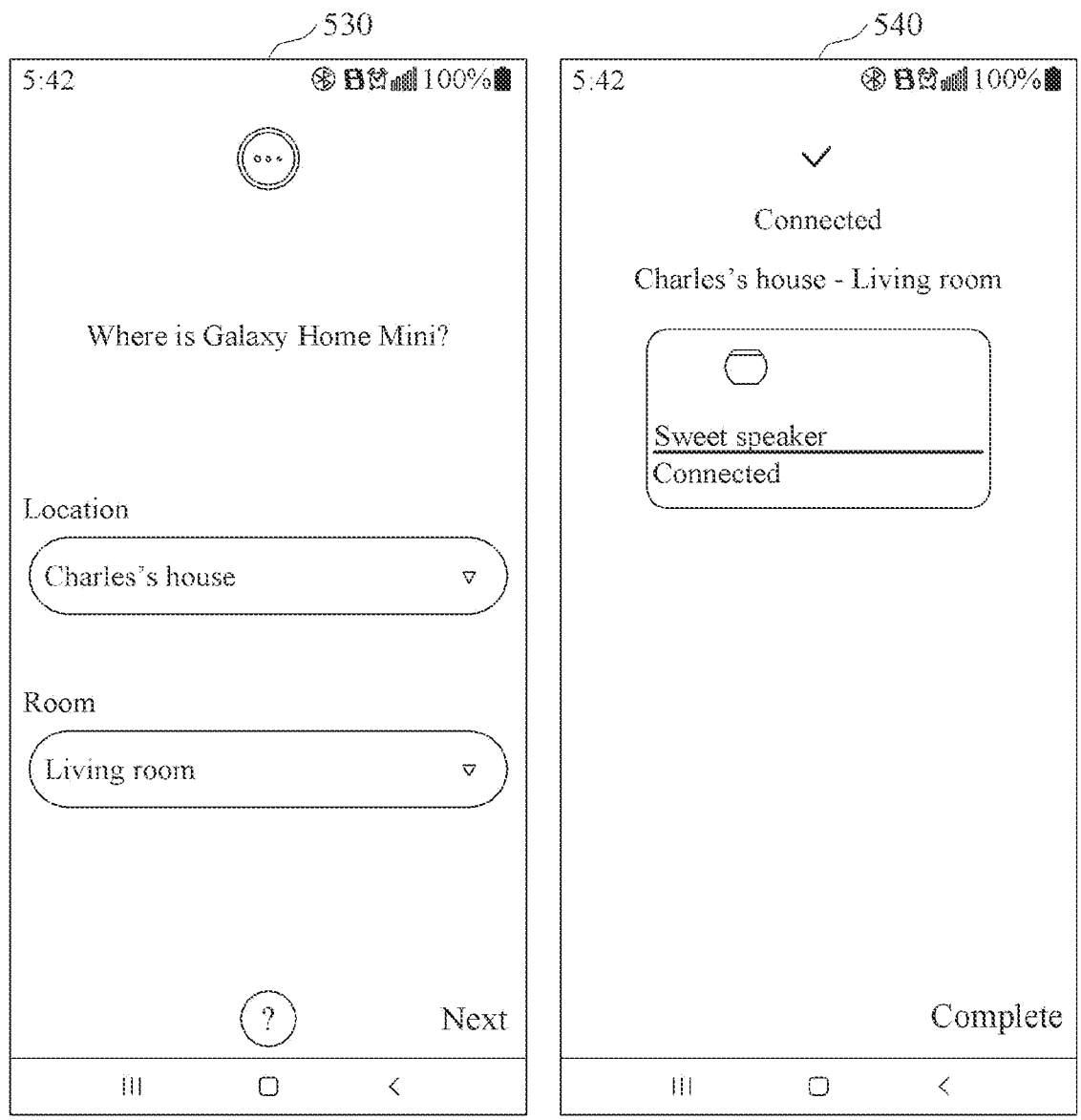
FIG. 5B is a diagram illustrating an example of an interface for providing device information of a first terminal determined based on device information of a second terminal, according to one embodiment.
Figure 5C:
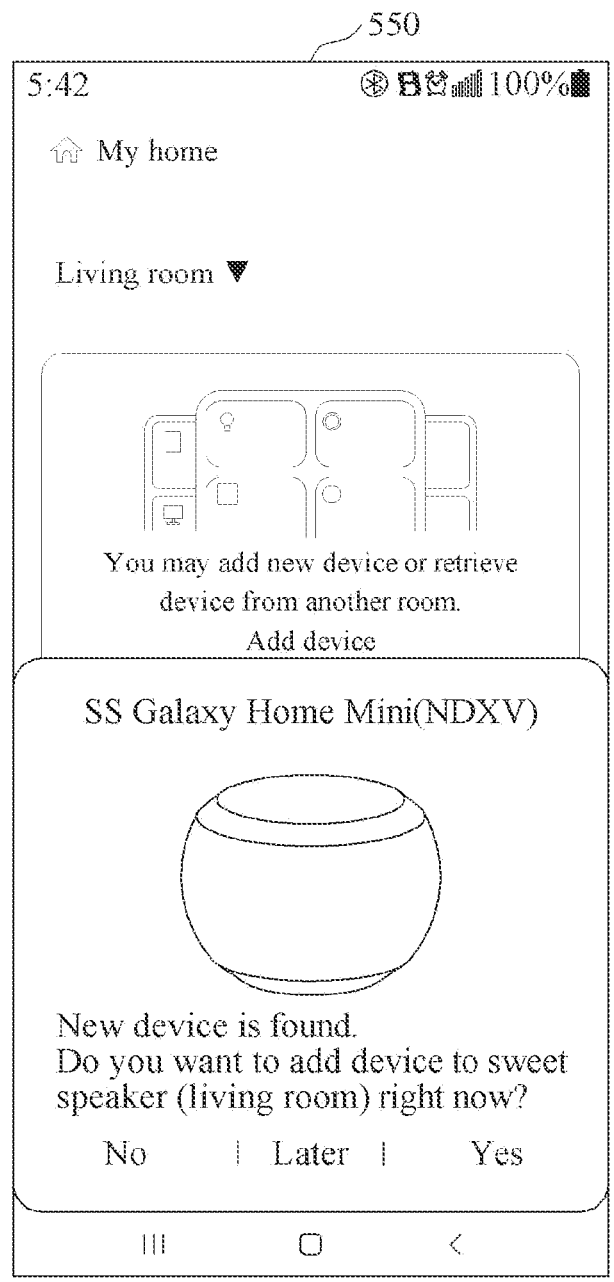
FIG. 5C is a diagram illustrating another example of an interface for providing device information of a first terminal determined based on device information of a second terminal, according to one embodiment.

FIG. 5A is a diagram illustrating an example of an interface for receiving device information directly from a user, according to one embodiment.

Referring to FIG. 5A, when adding a new device in the real space, a location information input interface 510 of a typical user terminal may be displayed on a display of the new device. The default information (e.g., 'my home' or a 'kitchen') may be irrelevant or incorrect as to the room where an actual device is. Accordingly, it may be inconvenient to directly input device information. In addition, a device name input interface 520 of the typical user terminal may display a preset default device name (e.g., 'Home Mini (NDXV)'), and the user may need to directly input a device name.

FIG. 5B is a diagram illustrating an example of an interface for providing device information of a first terminal determined based on device information of a second terminal, according to one embodiment.

Referring to FIG. 5B, the first terminal 230 may recommend device information of the first terminal 230 that is determined based on device information of the second terminal 250 in a field. More specifically, a location name (e.g., 'Charles's house') and room name (e.g., a 'living room') of the second terminal 250, in the metaverse, of the same device type and device model as those of the first terminal 230 may be displayed, as a default. That is, default information that is more likely to be correct is displayed in a field of a location information input interface 530 of the first terminal 230. In addition, a device name input interface 540 of the first terminal 230 may display, as a default, a device name (e.g., a 'sweet speaker') of the second terminal 250.

FIG. 5C is a diagram illustrating another example of an interface for providing device information of a first terminal determined based on device information of a second terminal, according to one embodiment.

Referring to FIG. 5C, when adding the first terminal 230 to the real space, the first terminal 230 may provide a registration proposal interface 550 including device information automatically determined based on device information of the second terminal 250.

Figure 6:
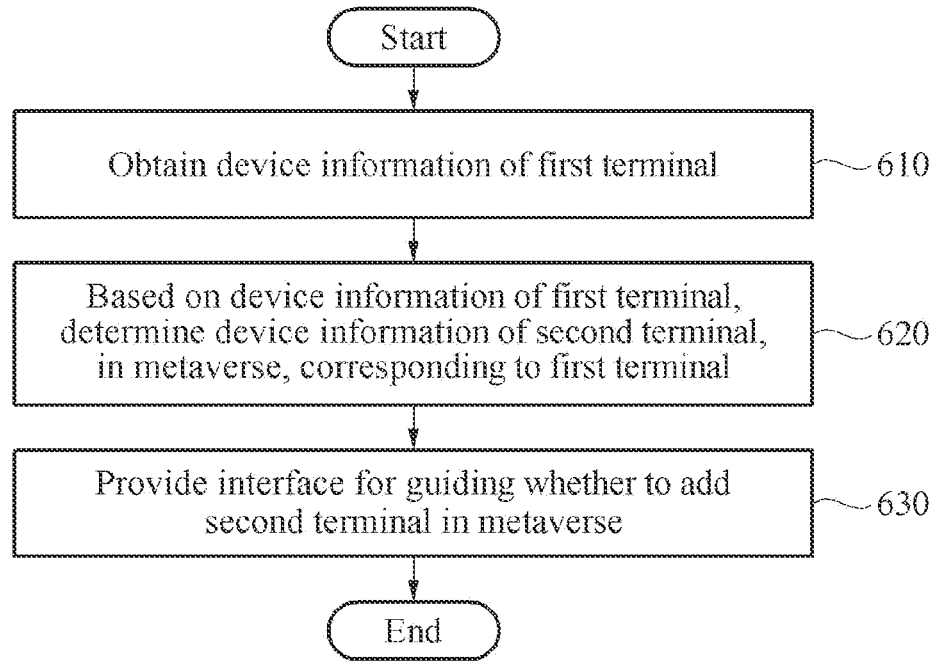
FIG. 6 is a flowchart illustrating a method of determining device information of a second terminal, based on device information of a first terminal, according to one embodiment.

FIG. 6 is a flowchart illustrating a method of determining device information of a second terminal, based on device information of a first terminal, according to one embodiment. In certain embodiments, an interface for adding the second terminal in the metaverse is provided.

Operations 610, 620, and 630 of FIG. 6 may be performed by the server 210 described above with reference to FIGS. 2A and 2B, and the descriptions provided with reference to FIGS. 1 to 2B may also apply to the description of FIG. 6. Although operations of FIG. 6 may be performed in the illustrated order and manner therein, the order of some of the operations may change or some of the operations may be omitted, without departing from the spirit and scope of the illustrated embodiment. The operations illustrated in FIG. 6 may be performed in parallel or simultaneously.

Moreover, the operations described in FIG. 6 can be performed by a processor connected to a memory storing a plurality of instructions, wherein execution of the instructions causes the processor to perform the operations.

When a user purchases an actual device in the real space and completes a device setting, the user may install a metaverse device, in the metaverse. The metaverse device corresponds to the actual device, based on the device setting of the actual device. In this case, device information of the metaverse device may be determined based on device information of the actual device.

More specifically, in operation 610, the server 210 may obtain the device information of the first terminal 230. The server 210, in response to registration of the device information of the first terminal 230, may obtain the device information of the first terminal 230. For example, when the user purchases the actual device in the real space and completes the device setting, the first terminal 230 may transmit, to the server 210, a device information registration signal. The device information of the first terminal 230 may include essential information and input information.

In operation 620, the server 210, based on the device information of the first terminal 230, may determine device information of the second terminal 250, in the metaverse, corresponding to the first terminal 230. For example, the server 210 may determine a location name, room name, and device name of the first terminal 230 to be a location name, room name, and device name of the second terminal 250 as they are.

Alternatively, the server 210, based on the device matching information, may determine the device information of the second terminal 250. For example, when the location name (e.g., my home) and room name (e.g., a main room) of the first terminal 230 respectively match the location name (e.g., a house) and room name (e.g., a large room) of the second terminal 250, based on this information, the server 210 may determine the location name (e.g., a house) and room name (e.g., the large room) of the second terminal 250.

In operation 630, the server 210 may provide an interface for guiding whether to add the second terminal 250 to the metaverse.

Figure 7:
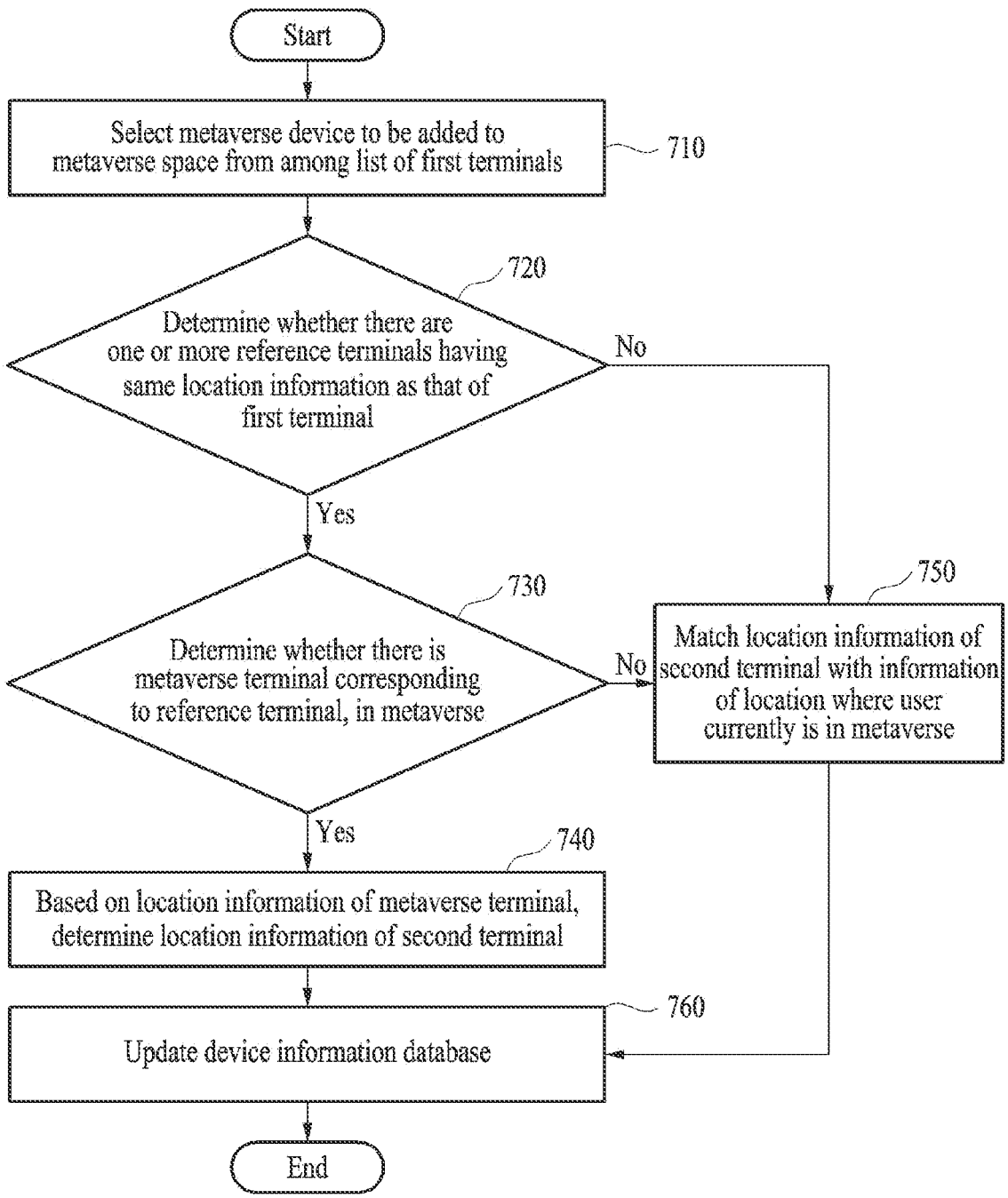
FIG. 7 is a flowchart illustrating an example of a method of determining device information of a second terminal, based on device information of a first terminal, according to one embodiment.

FIG. 7 is a flowchart illustrating an example of a method of determining device information of a second terminal, based on device information of a first terminal, according to one embodiment.

The descriptions provided with reference to FIGS. 1 to 2B may also apply to the description of FIG. 7. Although operations of FIG. 7 may be performed in the illustrated order and manner therein, the order of some of the operations may change or some of the operations may be omitted, without departing from the spirit and scope of the illustrated embodiment. The operations illustrated in FIG. 7 may be performed in parallel or simultaneously. Moreover, the operations described in FIG. 7 can be performed by a processor connected to a memory storing a plurality of instructions, wherein execution of the instructions causes the processor to perform the operations.

In operation 710, a user may select a metaverse device to be added to the metaverse space from among the list of first terminals 230 that is owned by the user and is in the real space. Operation 710 may be performed in the metaverse space. For example, to add a speaker registered in the real space to the metaverse space, the user may perform a selection operation for adding the speaker in the metaverse.

In operation 720, the server 210 may determine whether there are one or more reference terminals having the same location information as that of the first terminal 230. For example, when adding the speaker to the metaverse space, the location information of the speaker and a refrigerator is assumed to be the same (for example, a location name is 'my home' and a room name is a 'main room'). In this case, the server 210 may determine the refrigerator having the same location information as the speaker in the real space to be a reference terminal.

In operation 730, the server 210, based on determination that there is a reference terminal, may determine whether there is a metaverse terminal corresponding to the reference terminal, in the metaverse. For example, the server 210 may determine whether there is a refrigerator in the metaverse space.

In operation 740, the server 210, based on location information of the metaverse terminal, may determine the location information of the second terminal 250. For example, the server 210 may determine location information (e.g., a location name is a 'house' and a room name is a 'large room') of the refrigerator in the metaverse space to be the location information of the speaker.

When there is no reference terminal or there is no metaverse terminal corresponding to the reference terminal, in the metaverse, in operation 750, the server 210 may match the location information of the second terminal 250 with information of a location where the user currently is in the metaverse space. For example, when the user currently is in the 'large room' in the 'house' in the metaverse, the location name of the speaker may be the 'house' and the room name of the speaker may be the 'large room'.

In operation 760, the server 210 that has determined the device information of the second terminal 250 may update the device information database 217.

Figure 8:
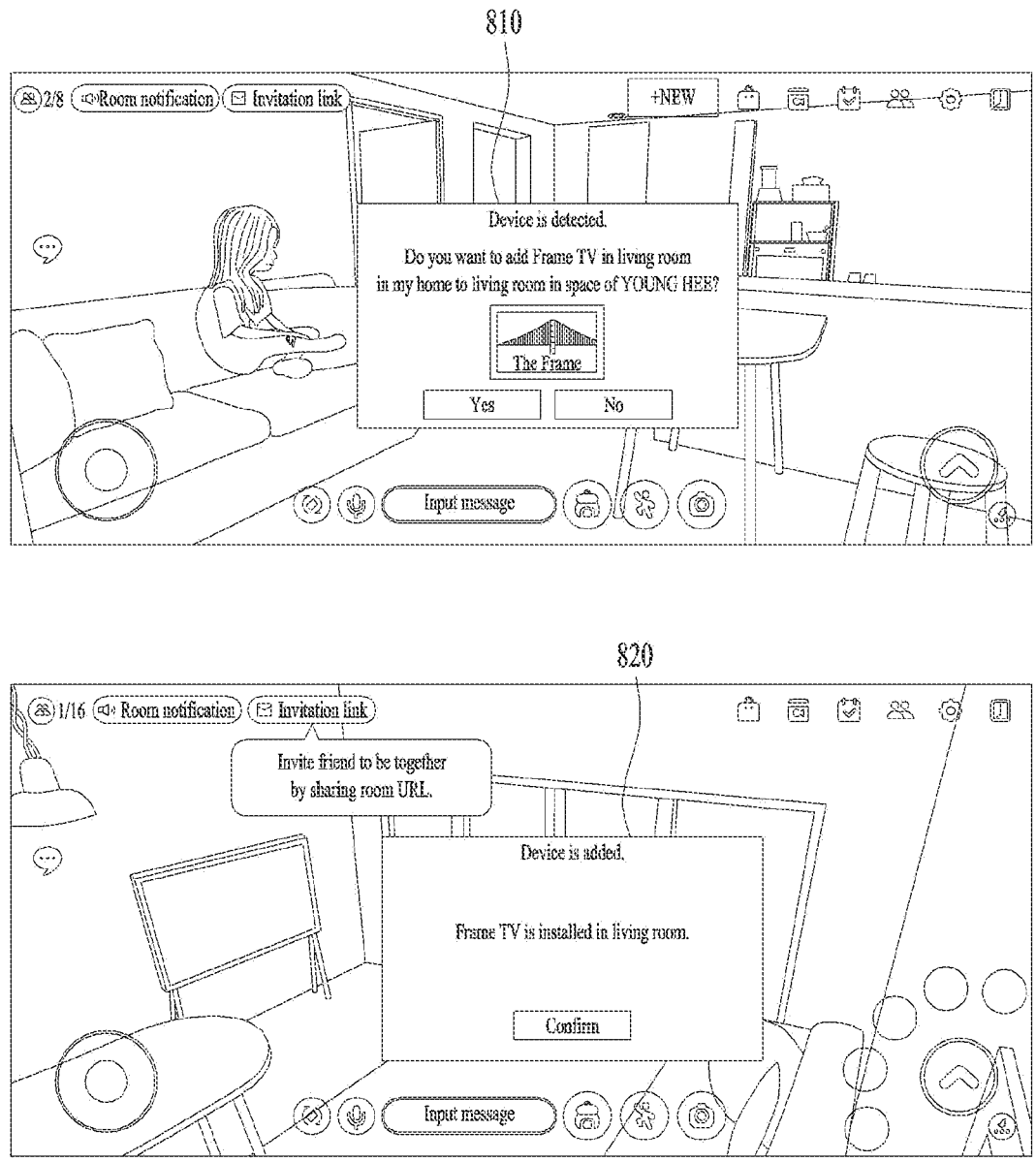
FIG. 8 is a diagram illustrating an example of an interface for providing device information of a second terminal determined based on device information of a first terminal, according to one embodiment.

FIG. 8 is a diagram illustrating an example of an interface for providing device information of a second terminal determined based on device information of a first terminal, according to one embodiment.

Referring to FIG. 8, the second terminal 250, when adding the second terminal 250 to the metaverse space, may provide a registration proposal interface 810 including device information automatically determined based on device information of the first terminal 230.

For example, when the first terminal 230 is added to the real space, a user may confirm the registration proposal interface 810 through a user notification in a metaverse application. Only by confirming the registration proposal interface 810, the user may add the second terminal 250 to the metaverse space.

According to certain embodiments, an operating method of a server comprises: receiving, from a first terminal, a request to register device information; obtaining device information of a second terminal, in a metaverse, based on device matching information stored at the server that for the first terminal; and determining device information of the first terminal, based on the device information of the second terminal, wherein the device matching information comprises innate attributes of the first terminal and the second terminal.

According to certain embodiments, determining the device information of the first terminal comprises: based on location information and device name information corresponding to the second terminal, obtaining at least one of location information and device name information of the first terminal.

According to certain embodiments, the innate attributes comprise at least one of a device type and a device model.

According to certain embodiments, obtaining the device information of the second terminal comprises: based on the device matching information, determining the device information of the second terminal having a predetermined relationship with the first terminal.

According to certain embodiments, obtaining the device information of the second terminal having a predetermined relationship with the first terminal comprises: based on the device matching information, determining whether there are one or more metaverse terminals of the same device type as that of the first terminal; and based on a determination that there are one or more metaverse terminals of the same device type as that of the first terminal, determining whether there is a terminal of the same device model as that of the first terminal among the one or more metaverse terminals.

According to certain embodiments, obtaining the device information of the second terminal comprises determining device information of a metaverse terminal of the same device model as that of the first terminal.

According to certain embodiments, obtaining the device information of the second terminal comprises: based on a determination that there is no metaverse terminal of the same device model as that of the first terminal, determining whether there is a metaverse terminal having a similarity greater than or equal to a predetermined similarity to device model of the first terminal.

According to certain embodiments, obtaining the device information of the second terminal comprises: determining device information of a metaverse terminal having a similarity greater than or equal to a predetermined similarity to device model of the first terminal.

According to certain embodiments, the operating method further comprises: when there is no metaverse terminal having a similarity greater than or equal to a predetermined similarity to device model of the first terminal, transmitting, to the first terminal, a request to input the device information of the first terminal.

According to certain embodiments, the operating method further comprises transmitting, to the first terminal, the device information of the first terminal.

According to certain embodiments, an operating method of a server comprises: obtaining device information of a first terminal; determining device information of a second terminal based on the device information of the first terminal, in a metaverse; and providing an interface for guiding whether to add the second terminal to the metaverse, wherein providing the interface comprises providing an interface for providing the device information of the second terminal.

According to certain embodiments, determining the device information of the second terminal comprises, in response to registration of the device information of the first terminal, obtaining the device information of the second terminal.

According to certain embodiments, determining the device information of the second terminal comprises, in response to an input of selecting the second terminal to be added to the metaverse among one or more real terminals of which device information is registered, obtaining the device information of the first terminal corresponding to the second terminal.

According to certain embodiments, obtaining the device information of the first terminal comprises matching location information of the first terminal with location information of the second terminal.

According to certain embodiments, determining the device information of the second terminal comprises determining whether there are one or more reference terminals having the same location information as that of the first terminal.

According to certain embodiments, obtaining the device information of the first terminal comprises: based on a determination that there is no reference terminal having the same location information as that of the first terminal, matching location information of the first terminal with location information of the second terminal.

According to certain embodiments, obtaining the device information of the first terminal comprises: based on determination that there is a reference terminal having the same location information as that of the first terminal, determining whether there is a metaverse terminal corresponding to the reference terminal, in the metaverse; and based on location information of the metaverse terminal, determining the location information of the second terminal.

According to certain embodiments, an Internet of Things (IoT) terminal comprises: a memory storing at least one instruction; and at least one processor configured to execute the at least one instruction, wherein execution of the at least one instruction by the at least one processor causes the at least one processor to perform a plurality of operations, the plurality of operations comprising: transmitting, to a server, a request to register device information of the IoT terminal, and based on the device information, received from the server, of the IoT terminal, providing a device registration interface.

According to certain embodiments, the plurality of operations further comprises providing the device registration interface with location information and device name information of the IoT terminal, as default values, wherein the location information and device name information of the IoT terminal are determined based on the device information of the IoT terminal.

According to one embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An operating method of a server, the operating method comprising:
   receiving, from a first terminal, a request to register device information;
   obtaining device information of a second terminal, in a metaverse, based on device matching information stored at the server prior to receiving the request to register device information from the first terminal; and
   determining device information of the first terminal, based on the device information of the second terminal, wherein
   the device matching information comprises innate attributes of the first terminal and the second terminal.

2. The operating method of claim 1, wherein determining the device information of the first terminal comprises:
   based on location information and device name information corresponding to the second terminal, obtaining at least one of location information and device name information of the first terminal.

3. The operating method of claim 1, wherein
   the innate attributes comprise at least one of a device type and a device model.

4. The operating method of claim 1, wherein obtaining the device information of the second terminal comprises:
   based on the device matching information, determining the device information of the second terminal having a predetermined relationship with the first terminal.

5. The operating method of claim 4, wherein obtaining the device information of the second terminal having a predetermined relationship with the first terminal comprises:
   based on the device matching information, determining whether there are one or more metaverse terminals of the same device type as that of the first terminal; and
   based on a determination that there are one or more metaverse terminals of the same device type as that of the first terminal, determining whether there is a terminal of the same device model as that of the first terminal among the one or more metaverse terminals.

6. The operating method of claim 5, wherein obtaining the device information of the second terminal comprises determining device information of a metaverse terminal of the same device model as that of the first terminal.

7. The operating method of claim 5, wherein obtaining the device information of the second terminal comprises:
   based on a determination that there is no metaverse terminal of the same device model as that of the first terminal, determining whether there is a metaverse terminal having a similarity greater than or equal to a predetermined similarity to device model of the first terminal.

8. The operating method of claim 5, wherein obtaining the device information of the second terminal comprises:
   determining device information of a metaverse terminal having a similarity greater than or equal to a predetermined similarity to device model of the first terminal.

9. The operating method of claim 5, further comprising:
   when there is no metaverse terminal having a similarity greater than or equal to a predetermined similarity to device model of the first terminal, transmitting, to the first terminal, a request to input the device information of the first terminal.

10. The operating method of claim 1, further comprising transmitting, to the first terminal, the device information of the first terminal.

11. An operating method of a server, the operating method comprising:
    obtaining device information of a first terminal;
    determining device information of a second terminal based on the device information of the first terminal, in a metaverse wherein the device information of the second terminal is stored prior to obtaining device information of the first terminal; and
    providing an interface for guiding whether to add the second terminal to the metaverse, wherein providing the interface comprises providing an interface for providing the device information of the second terminal.

12. The operating method of claim 11, wherein determining the device information of the second terminal comprises, in response to registration of the device information of the first terminal, obtaining the device information of the second terminal.

13. The operating method of claim 11, wherein determining the device information of the second terminal comprises, in response to an input of selecting the second terminal to be added to the metaverse among one or more real terminals of which device information is registered, obtaining the device information of the first terminal corresponding to the second terminal.

14. The operating method of claim 11, wherein obtaining the device information of the first terminal comprises matching location information of the first terminal with location information of the second terminal.

15. The operating method of claim 11, wherein determining the device information of the second terminal comprises determining whether there are one or more reference terminals having the same location information as that of the first terminal.

16. The operating method of claim 15, wherein obtaining the device information of the first terminal comprises:
based on a determination that there is no reference terminal having the same location information as that of the first terminal, matching location information of the first terminal with location information of the second terminal.

17. The operating method of claim 15, wherein obtaining the device information of the first terminal comprises:
based on determination that there is a reference terminal having the same location information as that of the first terminal, determining whether there is a metaverse terminal corresponding to the reference terminal, in the metaverse; and
based on location information of the metaverse terminal, determining the location information of the second terminal.

18. A non-transitory computer-readable storage medium storing instructions that, when executed by a processor, cause the processor to perform the operating method of claim 1.

19. An Internet of Things (IoT) terminal comprising:
a memory storing at least one instruction; and
at least one processor configured to execute the at least one instruction, wherein execution of the at least one instruction by the at least one processor causes the at least one processor to perform a plurality of operations, the plurality of operations comprising:
transmitting, to a server, a request to register device information of the IoT terminal, and
providing a device registration interface including the device information of the IoT terminal, received from the server,
wherein the device information is determined from device information of other IoT terminal specified as a device corresponding to the IoT terminal based on device matching information stored at the server.

20. The IoT terminal of claim 19, wherein the plurality of operations further comprises providing the device registration interface with location information and device name information of the IoT terminal, as default values, wherein the location information and device name information of the IoT terminal are determined based on the device information of the IoT terminal.

* * * * *